May 19, 1959     P. F. MARX     2,887,446
PIPE COUPLING

Filed Sept. 20, 1956     2 Sheets-Sheet 1

May 19, 1959 P. F. MARX 2,887,446
PIPE COUPLING
Filed Sept. 20, 1956 2 Sheets-Sheet 2

United States Patent Office 2,887,446
Patented May 19, 1959

2,887,446

PIPE COUPLING

Paul F. Marx, Bradford, Pa., assignor to Dresser Industries, Inc., Dallas, Tex., a corporation of Delaware Application September 20, 1956, Serial No. 610,941

8 Claims. (Cl. 204—197)

This invention relates to the protection of pipe joints against corrosion and is more particularly concerned with the provision of pipe joint devices having high resistance to deterioration arising from galvanic action in the soil.

Pipe lines for the transmission of oil, water, gas, and the like are customarily formed from many sections of metallic pipe inter-connected by pipe joint devices which comprise various means for insuring fluid-tight junctions between the adjoining pipe sections while at the same time providing a sufficiently flexible joint to accommodate the normal expansion and contraction of the line under the conditions of service. Couplings commonly in use for this purpose consist of sleeves or "middle rings" which are slipped over the ends of the adjacent pipe sections, and "followers" which are slipped over the pipe sections on each side of the middle ring and are then drawn against the ends of the middle ring by means of bolts. Suitable gaskets placed at the ends of the middle ring are compressed by the action of the followers to provide a fluid-tight seal.

In another type of pipe joint, the adjacent pipe sections are formed with bell and spigot ends with the spigot end of one section being received in the bell end of the other section. The annular space remaining in the bell is packed with caulking material, e.g. lead or cement, and this packing is held in place by a pipe joint device in the nature of a clamp which consists of an anchor ring which fits the outside of the bell, a follower ring which acts upon a gasket positioned against the exposed surface of the bell packing, and bolts extending between the two rings to apply compressing forces upon the gasket.

It is well known that these pipe lines are continuously subject to corrosion attack by the destructive action of electric currents. A major practical problem in the construction of pipe lines of this type is, consequently, the adequate protection of the pipe lines, and particularly the fluid-tight joints between the pipe sections from these destructive agencies. It is of great practical importance to reduce to a minimum the need for repair or replacement of parts, since such maintenance is expensive and time consuming and necessitates costly interruptions in service. It will be understood that corrosion attack of the bolts, which serve to maintain the necessary sealing pressure upon the gaskets notwithstanding the expansion and contraction of the pipes and notwithstanding the flexing of the pipe line in service, is a particularly serious problem. If the bolts fail, sealing pressure is released and leakage results. It has been proposed, therefore, to coat the exterior of the surfaces to be protected with various types of protective coverings, such as bituminous coating compositions, fibrous bitumen-impregnated shields, and the like. Protective coverings of this type are well known and extensively used. Generally, the protective coating or other protective covering is applied in the field, i.e., the pipes are treated at the side of the trench in which they are to be laid. Either individual pipe sections are coated and/or wrapped and are thereafter coupled, or, coupled sections are treated by means of portable coating and wrapping machines which are moved along the assembled line. When treated before assembly, the pipes are customarily supported on rigs which permit the pipes to be rotated, thereby facilitating the application of the coating.

In either method of application the couplings or clamps present a special problem in attaining full protection for the line. In the case of application before assembly, it is customary to leave the portions at each end of the pipe section uncoated, in part to permit the proper mounting of the couplings or clamps, and in part because the end portions rest on the rollers of the supporting rig. In the case of application after assembly, it is customary to guide the coating and wrapping machines as close to the joint as possible and then to interrupt the application and resume it on the other side of the joint.

Special methods have, therefore, been devised to protect the joint structure. Methods commonly employed involve the hand application of coatings or suitable wrappings. Such treatment is expensive, time-consuming and not fully satisfactory for the reason that the various projecting surfaces of the coupling or clamp are difficult to reach and to cover with a uniform layer of material.

If a sufficiently fluid coating composition is used to insure penetration into all of the crevices of the coupling or clamp and thus to permit the desired coverage of all exposed portions, the coating is necessarily so soft that it is unduly susceptible to the abrasive action of the soil. As a result, the coating film is soon injured and the coupling is exposed to attack. In order to avoid this difficulty, it has been proposed to surround the joint and the adjacent pipe ends with a thick layer of a plastic material. Such material, however, requires a bulky, complicated housing for its application. In some cases the housing is removed after the plastic composition, which is poured into the housing as a hot fluid, has cooled and hardened, while in other instances the housing forms a permanent part of the installation. It has been proposed, for example, to assemble the housing around the joint and then to fill the housing with the plastic protective material heated to the extent necessary to render it fluid. A suitable aperture is provided in the top of the housing through which the hot fluid material is poured. The housing aperture is then closed and the coating allowed to cool and harden.

This method of treatment has the disadvantage of being time-consuming and requiring special tools, materials, and relatively skilled labor. Not only is the assembly of the housing a major task but care must be taken in pouring the molten coating composition to drive out all of the air in order that all exposed surfaces of the coupling or clamp will be reached and covered. This requires careful control both of the temperature of the composition and the rate of pouring. Furthermore, the bulkiness of the housing makes it difficult to apply after the pipe has been laid in the trench and working space is limited, a situation which frequently occurs in some types of installation.

Another approach to the problem involves the use of so-called "cathodic-protection" systems which require special, relatively-expensive appliances and need highly-skilled labor for their proper installation. A typical system, for example, requires the burying in the soil of a plurality of "sacrificial" anodes of a metal electronegative to the pipe line structure to be protected. Thus, such sacrificial anodes, usually of magnesium or zinc, are buried in the earth near the pipe line and connected to it by electrical conductors. The resulting flow of current maintains the pipe line cathodic with respect to the soil and reduces corrosion. For proper action it is necessary to bury each sacrificial anode in a prepared bed or backfill designed to control the chemical nature of the anode environment. The difficulty and expense, both in time and skilled man-power, of providing adequate "cathodic-protection" systems will be apparent.

From a practical standpoint, therefore, there are serious difficulties in carrying out the heretofore suggested proposals for protecting pipe joints, more particularly pipe couplings and clamps, against corrosion arising from the flow of electrical currents and resultant chemical reaction, i.e. galvanic action.

It is an object of the present invention to provide a pipe-joint device which has a high resistance to damage by galvanic action.

It is another object of the present invention to provide a pipe-joint device of the character indicated which does not depend for its resistance to damage upon the complex and expensive protecting means heretofore proposed.

It is a further object of the invention to provide a damage-resistant pipe coupling or pipe clamp which can be installed rapidly and easily and by relatively unskilled labor.

In accordance with the invention there is provided a pipe-joint device which includes a sealing gasket, a gasket follower for applying sealing pressure to the gasket, bolts for applying the follower against the gasket, and anchor means for receiving the bolts and holding them against displacement when they are acting upon the follower. In the case of a bell and spigot pipe clamp, the anchor means takes the form of a ring adapted to surround the bell end of the pipe being connected, and in the case of a plain-end pipe coupling of the type involving a central sleeve or "middle ring," the anchor means also serves as a gasket follower on the opposite side of the sleeve.

It is a feature of the pipe-joint device of the invention that the bolts and the nuts which are employed with them are formed from a metal or alloy which is electropositive, i.e. more "noble," with respect to the remainder of the metallic portions of the device, viz. with respect to the follower and the anchor means, and with respect to the coupling sleeve in a plain-end pipe coupling, the bolts being electropositive within a specified range. Thus, we have found that unexpected and surprisingly satisfactory results are obtained when the bolts and nuts are 10 to 150 millivolts more electropositive, preferably 10 to 100 millivolts more electropositive (more "noble"), than the remainder of the metallic portions of the device.

It is another feature of the invention that the total surface area $A_c$ of the less electropositive metallic portions of the pipe joint device is substantially greater than the total surface area $A_b$ of the more electropositive bolts and nuts, viz. $A_c > A_b$. While the ratio between $A_c$ and $A_b$ will vary, depending upon the particular construction of the pipe-joint device, it should be at least 4:1.

Further objects and features of the invention will be readily apparent from the following detailed description and from the accompanying drawings, wherein, Fig. 1 is an elevational view, partly in section to show details of construction, of a plain-end pipe coupling embodying features of the present invention;

Figure 1:
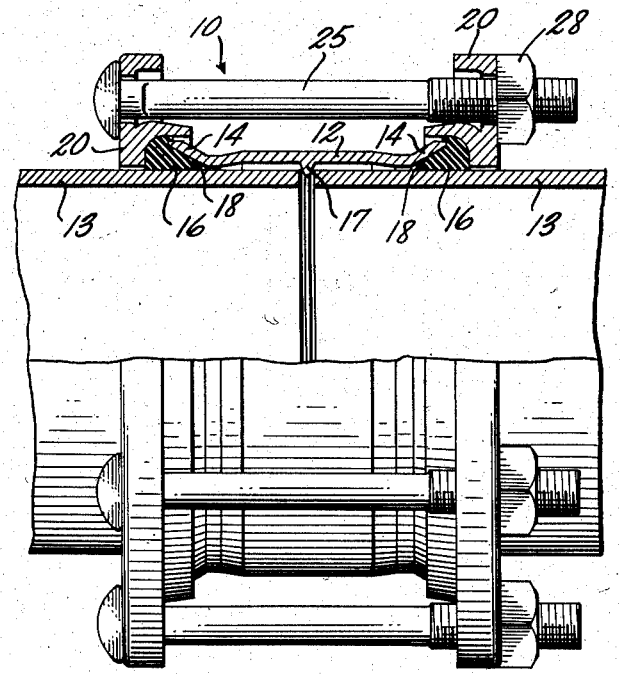
Figure 2:
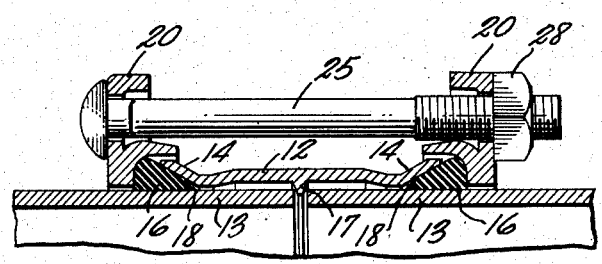
Fig. 2 is a partial sectional view of the construction shown in Fig. 1.
Figure 3:
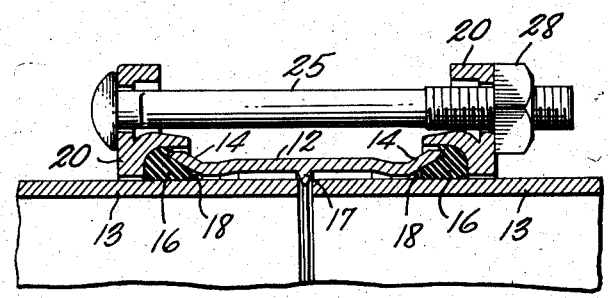
Fig. 3 is a similar partial sectional view of the coupling of Fig. 1.

Referring to the drawings, and more particularly to Figs. 1, 2 and 3, there is shown a so-called "compression" coupling forming a fluid-tight joint between opposed sections of plain-end pipe. The coupling, which is designated generally by the reference numeral 10, comprises a cylindrical sleeve or "middle ring" 12 encircling the ends of pipe sections 13 and having flared ends 14 defining annular recesses for reception of the axially inner ends of gaskets 16. A rib 17 serves to facilitate centering of the sleeve upon the pipe sections. The gaskets 16 are formed from rubber or rubber composition, e.g. natural rubber, synthetic rubbers and like elastomeric compounds, or compositions having like properties and characteristics, the material being relatively firm and solid but sufficiently resilient and elastic to flow under pressure to conform to the surfaces between which it is confined. In order to prevent undesired extrusion of the gasket material toward the center of the sleeve, there are suitably provided expansible metallic rings or helices 18. The gaskets 16 are forced under pressure against the ends of the middle ring 12 by means of "followers" 20 which are annular in form, as shown in Fig. 1. The followers 20 are drawn toward the center of sleeve 12 to apply sealing pressure to the gaskets by means of bolts 25 having associated nuts 28 threadedly engaged therewith. The relationship of parts when the coupling is first assembled upon the pipe ends is shown in Fig. 2 and the corresponding relationship when the nuts 28 are tightened upon bolts 25 is seen in Fig. 3, wherein the gaskets have been forced to conform to the surfaces between which they are confined, the compressing force upon the gaskets being maintained throughout the circumference of the coupling by the cooperating action of the bolts and nuts. It will be understood that the greater the pressure of the fluid flowing through the pipes, the greater the force which must be applied by the bolts and nuts to insure sealing of the coupling by the gaskets. It will be apparent, therefore, that corrosion of the bolts and nuts which would lead to a relaxation of this pressure would have an immediate adverse effect upon the fluid-tightness of the coupling and would require prompt repair or replacement.

In accordance with the invention, the bolts 25 and the nuts 28 which cooperate with them are, as previously indicated, formed entirely from a metal, or metal alloy, which is electro-positive, i.e. more "noble," than the remainting metallic portions of the coupling, viz. the sleeve 12 and the followers 20, within the previously-specified limits. At the same time, the total surface area $A_c$ of the followers 20 and the sleeve 12 is materially greater than the total surface area $A_b$ of the bolts 25 and nuts 28.

The electro-potential of metals and alloys is readily determined by standard, well-known means as described, for example, in the "Handbook of Chemistry and Physics" published by the Chemical Rubber Co., copyright 1949 and "Corrosion, Causes and Prevention" by Frank H. Speller, published by McGraw-Hill Publishing Co. Inc., copyright 1951, and in selecting the metals or alloys for the fabrication of the sleeve 12, the followers 20, the bolts 25, and the nuts 28, the choice of metals to provide the potential differences falling within the above specified range is readily accomplished. It is to be noted that the invention does not include the mere plating of the bolts and nuts which is entirely unsatisfactory. Similarly, the invention does not include bolts and nuts formed from bronze, brass, and the like. Such alloys are highly electropositive and it has been found that they lead to very rapid deterioration of the main iron portions of the coupling, thus defeating their purpose. The invention is, therefore, concerned with a combination of metals which exhibit a potential difference within the narrow range previously indicated.

By way of illustration, for example, when the sleeve 12 and the followers 20 are formed from malleable iron, particularly satisfactory results are obtained when the bolts 25 and the nuts 28 are formed from an iron alloy having, in addition to iron, small but effective amounts of the following components, as percentages by weight:

| | Percent |
|---|---|
| Carbon | Up to .12 |
| Manganese | .20 to .50 |
| Phosphorus | .07 to .15 |
| Sulphur | Up to .05 |
| Silicon | .25 to .75 |
| Copper | .25 to .55 |
| Chromium | .30 to 1.25 |
| Nickel | Up to .65 |

This alloy is, when tested by standard procedures, 15 to 60 millivolts more positive than malleable iron.

Similar highly satisfactory results are obtained when the sleeve 12 and the followers 20 are formed from malleable iron and the bolts and nuts are formed from the following iron alloy containing in addition to iron, small but effective amounts of the following components, as percentages by weight:

| | Percent |
|---|---|
| Carbon | Up to .12 |
| Manganese | .50 to 1.00 |
| Phosphorus | .06 to .15 |
| Sulphur | Up to .05 |
| Silicon | .10 to .75 |
| Copper | .25 to .70 |
| Chromium | .30 to 1.25 |
| Nickel | .25 to .75 |

This alloy is 12 to 40 millivolts more electropositive than malleable iron.

Figures 4, 5:
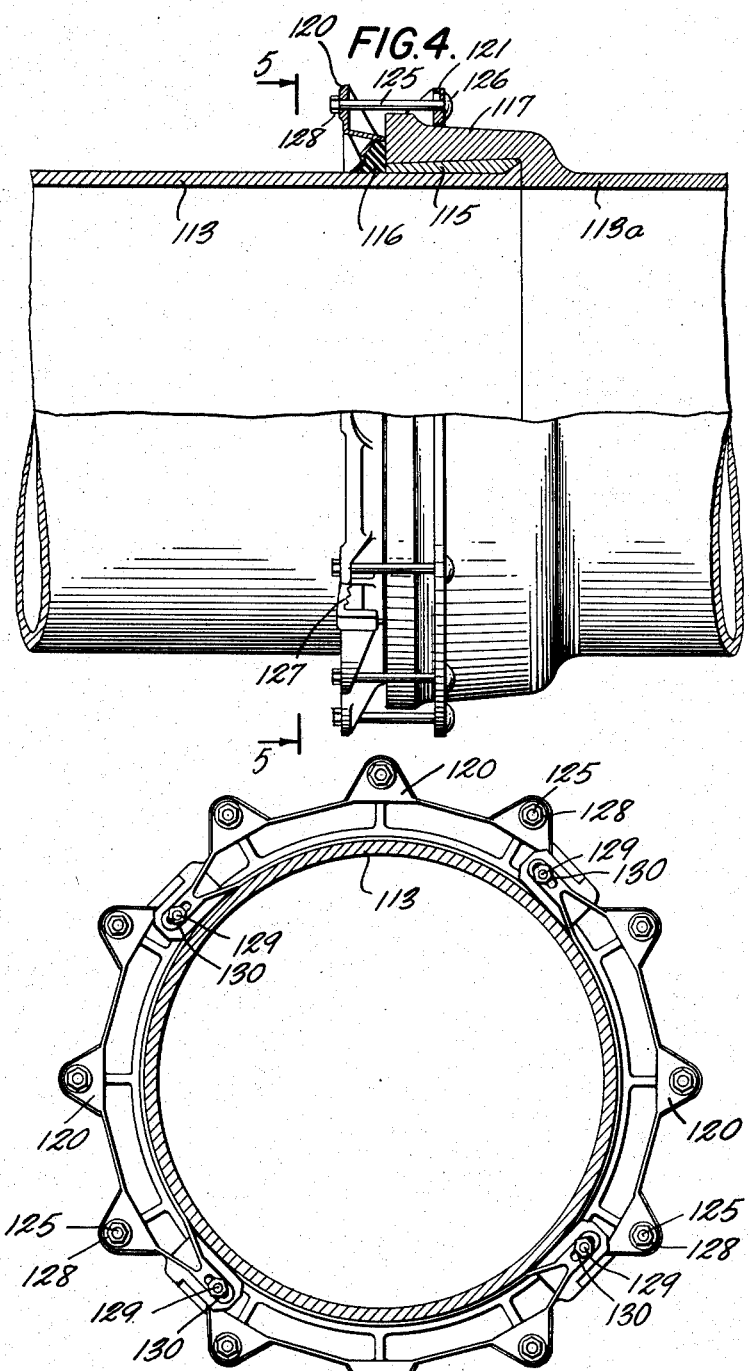
Fig. 4 is a sectional view, partly in elevation of a bell and spigot pipe clamp including features of the present invention.
Fig. 5 is an elevational view of the gasket follower of the construction of Fig. 4 as seen along the line 5—5 of Fig. 4.

As previously mentioned, the invention is applicable not only to couplings for plain-end pipe, such as shown in Figs. 1, 2 and 3, but also to other couplings of the type commonly used for forming a fluid-tight connection between adjacent sections of pipe, as exemplified by the so-called bell and spigot pipe clamp. Referring to Figs. 4 and 5, which illustrate a clamp for example, there is shown the spigot end of a pipe section 113 received in the bell end of a pipe section 113a with packing, such as lead or cement, 115 filling the annular space left between the two pipe sections within the bell 117. Disposed against the exposed portion of the packing 115 is a gasket 116 formed from the same type of material as that used in the formation of gaskets 16, i.e. a material which is relatively firm and solid but sufficiently resilient and elastic to flow under pressure to conform to the surfaces between which it is confined. Sealing pressure is applied to gasket 116 by means of a follower or "bull" ring 120 which is drawn toward the bell end 117 by the action of bolts 125 having heads 126 engaging in apertures formed in an annular ring 121 which engages the outer surface of the bell 117 to hold the bolts against axial displacement, nuts 128 cooperating with bolts 125 in the usual manner. In the particular embodiment illustrated, the ring 120 is formed from a plurality of arcuate segments, as shown in Fig. 5, which have inter-engaging teeth 127, the segments being interconnected by means of bolts 129 and cooperating nuts 130 engaging in suitable apertures formed at the ends of the segments. The anchor ring 121 is also suitably formed from interconnected segments to facilitate its application to the pipe.

In accordance with the invention, the bolts 125 and the nuts 128 are formed from a metal or alloy that is electropositive, i.e. more "noble" within the above-specified limits than the metal or alloy from which the remainder of the clamp, viz. the follower ring 120 and the anchor ring 121 is formed. The bolts 129 and nuts 130 are also suitably formed from the same or similar material as that used in the fabrication of the bolts 125 and nuts 128. For example, when the follower and anchor rings are formed from malleable iron, the bolts and nuts employed in clamp 110 are suitably formed from any of the iron alloys described above or similar materials which are 10 to 150 millivolts more electropositive than malleable iron.

In the constructions shown in Figs. 1 to 5, the ratio bebetween Ac, the total surface area of the coupling parts other than the nuts and bolts, is substantially greater than 4:1 with respect to Ab, the total surface area of the nuts and bolts. It will be understood that the invention is not limited to the use of the coupling and clamp constructions illustrated which correspond insofar as structural details are concerned, to constructions shown in Newell 2,415,753 and in Scharf 2,269,695. Other constructions such as shown in Risley 2,328,031, Pfefferle 2,230,468, for example, are suitably employed. The invention resides in providing in such couplings and clamps and the like, bolts and nuts which are 10 to 150 millivolts, preferably 10 to 100 millivolts, more electropositive than the remaining portions of the coupling or clamp.

While the invention has thus been illustrated and described with particular reference to certain preferred embodiments, it will be obvious that various changes and modifications in addition to those above mentioned may be made without departing from the scope of the invention as defined in the appended claims. It will be further understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What I claim and desire to secure by Letters Patent is:

1. A pipe coupling device adapted to provide a fluid-tight joint between two pipe sections by compressing a resilient gasket member comprising an axially-movable follower member for compressing the gasket, tension members engaging at one end said follower member for moving said follower member, and anchor means for engaging the other end of said tension members to hold the gasket and the follower member in compressive relation, said tension members having a total surface area which is small in relation to the combined surface area of the portions of said coupling other than said tension members and having an electrical potential from 10 millivolts to 150 millivolts more positive than said portions.

2. A pipe coupling device adapted to provide a fluid-tight joint between two pipe sections by compressing a resilient gasket member comprising an axially-movable follower member for compressing the gasket, tension members engaging at one end said follower members for moving said follower member, and anchor means for engaging the other end of said tension members to hold the gasket and the follower member in compressive relation, said tension members having a total surface area which is small in relation to the combined surface area of the portions of said coupling other than said tension members and having an electrical potential from 10 millivolts to 100 millivolts more positive than said portions.

3. A pipe coupling of the compressive gasket type comprising a sleeve, an axially-movable follower member for compressing a gasket against the ends of said sleeve, and tension members adapted to engage said sleeve and said follower member and to maintain the sleeve, gasket, and follower member in compressive relation, said tension members having a total surface area which is small in relation to the combined surface area of said sleeve and said follower member and having an electrical potential from 10 millivolts to 150 millivolts more positive than said sleeve and said follower member.

4. A coupling and repair device for a bell and spigot pipe joint comprising an annular anchor member engageable with the bell end pipe portion, an annular follower member adapted to press gasket means against said pipe portion, and tension members extending between said anchor member and said follower member to move said follower member axially to compress said gasket means into fluid sealing engagement with adjacent portions of the bell and spigot pipe, said tension members having an electrical potential which is from 10 millivolts to 150 millivolts more electropositive than the anchor member and the follower member.

5. A coupling and repair device for a bell and spigot pipe joint comprising an annular anchor member engageable with the bell end pipe portion, an annular follower member adapted to press gasket means against said pipe portion, and tension members extending between said anchor member and said follower member to move said follower member axially to compress said gasket means into fluid sealing engagement with adjacent portions of the bell and spigot pipe, said tension members having an electrical potential which is from 10 millivolts to 100 millivolts more electropositive than the anchor member and the follower member.

6. A pipe coupling device adapted to provide a fluid-tight joint between two pipe sections by compressing a resilient gasket member comprising an axially-movable follower member for compressing the gasket, tension members engaging at one end said follower member for moving said follower member, and anchor means for engaging the other end of said tension members to hold the gasket and the follower member in compressive relation, said tension members having a total surface area which is small in relation to the combined surface area of the portions of said coupling other than said tension members, said portions being formed from malleable iron and said tension members being formed from an iron alloy having an electrical potential from 10 millivolts to 150 millivolts more positive than said portions.

7. A pipe coupling of the compressive gasket type comprising a sleeve, an axially-movable follower member for compressing a gasket against the ends of said sleeve, and tension members adapted to engage said sleeve and said follower member and to maintain the sleeve, gasket, and follower member in compressive relation, said tension members having a total surface area which is small in relation to the combined surface area of said sleeve and said follower member, said sleeve and said follower member being formed from malleable iron and said tension members being formed from an iron alloy having an electrical potential from 10 millivolts to 100 millivolts more positive than said sleeve and said follower member.

8. A coupling and repair device for a bell and spigot pipe joint comprising an annular anchor member engageable with the bell end pipe portion, an annular follower member adapted to press gasket means against said pipe portion, and tension members extending between said anchor member and said follower member to move said follower member axially to compress said gasket means into fluid sealing engagement with adjacent portions of the bell and spigot pipe, said follower member and said anchor member being formed from malleable iron and said tension members being formed from an iron alloy having an electrical potential which is from 10 millivolts to 100 millivolts more electropositive than the anchor member and the follower member.

References Cited in the file of this patent

UNITED STATES PATENTS

| | | |
|---|---|---|
| 1,705,197 | Mills | Mar. 12, 1929 |
| 1,804,078 | Baden | May 5, 1931 |
| 2,299,090 | Hothersall | Oct. 20, 1942 |
| 2,343,440 | Andrus | Mar. 7, 1944 |
| 2,741,497 | Risley | Apr. 10, 1956 |